United States Patent
Habeger et al.

(12)

(10) Patent No.: US 6,458,414 B1
(45) Date of Patent: Oct. 1, 2002

(54) METHOD OF MANUFACTURING LANTHENUM OXIDE CONTAINING SOLIDS IN AN AQUEOUS ENVIRONMENT

(75) Inventors: Craig F. Habeger, West Richland, WA (US); Timothy R. Armstrong, Clinton, TN (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/628,117

(22) Filed: Jul. 28, 2000

(51) Int. Cl.⁷ .............................. B05D 7/00; B05D 5/00
(52) U.S. Cl. ..................... 427/215; 427/220; 427/399
(58) Field of Search ..................... 423/263; 427/215, 427/220, 399; 501/152; 428/403

(56) References Cited

U.S. PATENT DOCUMENTS 3,607,371 A * 9/1971 Haynes et al. ............... 427/157
5,914,287 A * 6/1999 Saito et al. .................. 423/263

OTHER PUBLICATIONS

Y Liu et al., "*Rare Earth and Yttrium Phosphate Solubilities in Aqueous Solution*", pp. 1625–1633. 1997, no month.

RE Chodelka, "*The Aqueous Processing of Barium Titanate: Passivation, Dispersion, And Binder Formulations For Multilayer Capacitors*", pp. 1–198. 1996, no month.

* cited by examiner

Primary Examiner—Steven Bos
(74) Attorney, Agent, or Firm—Stephen R. May; Douglas E. McKinley, Jr.

(57) ABSTRACT

A method for processing lanthanum oxide solids in an aqueous solution. An aqueous solution containing a partially soluble or insoluble salt forming anion is provided. A soluble lanthanum oxide solid is then added to the solution, and the anion is then reacted with at least a portion of the lanthanum in the lanthanum oxide solid, thereby forming a partially soluble or insoluble salt coating around the lanthanum oxide solid.

5 Claims, 3 Drawing Sheets

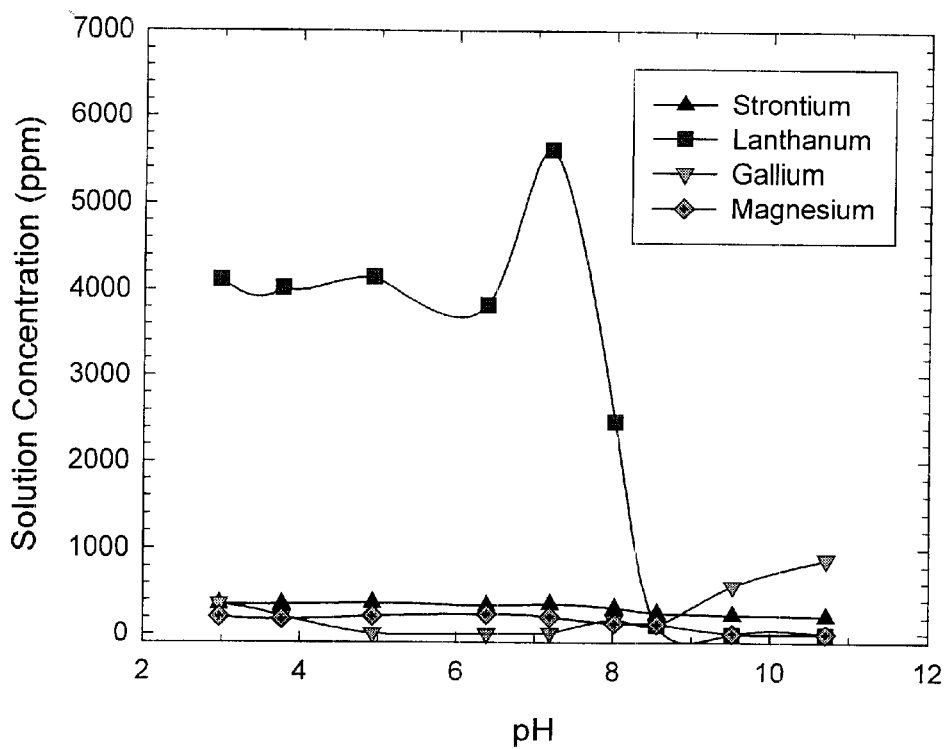
Figure 1. Analyte concentration as a function of pH for LSGM9182 in DI $H_2O$.

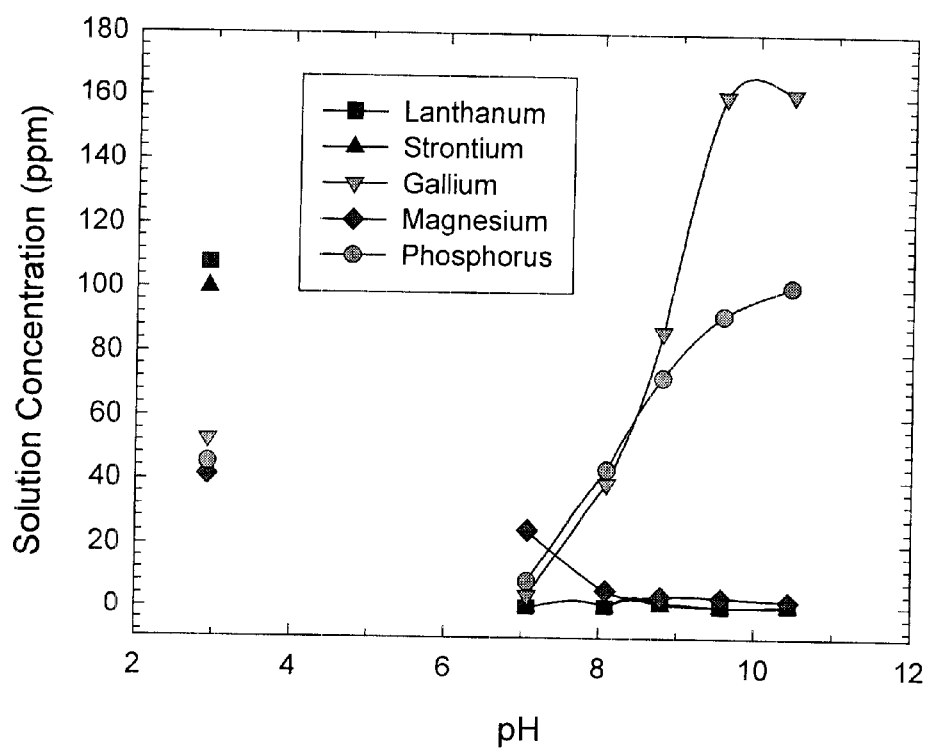
Figure 2. Analyte concentration as a function of pH for LSGM9182 in 0.01 M $H_3PO_4$.

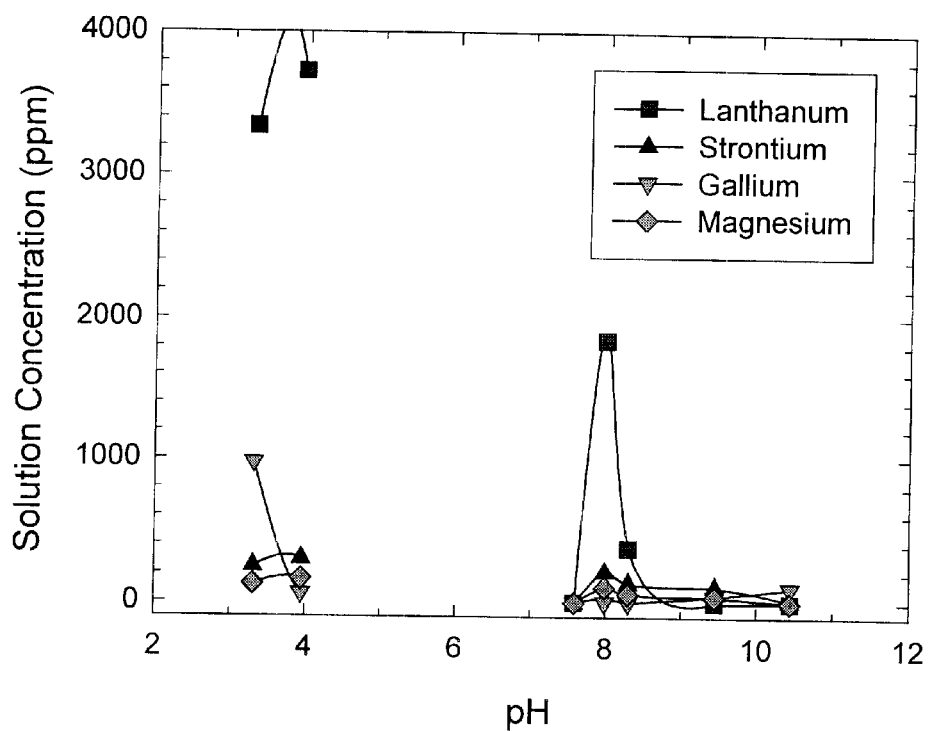
Figure 3. Analyte concentration as a function of pH for LSGM9182 in 0.01 M $H_2C_2O_4$.

METHOD OF MANUFACTURING LANTHENUM OXIDE CONTAINING SOLIDS IN AN AQUEOUS ENVIRONMENT

FIELD OF THE INVENTION

This invention was made with Government support under Contract DE-AC0676RL01830 awarded by the U.S. Department of Energy. The Government has certain rights in the invention.

The present invention relates generally to method for manufacturing lanthanum oxide containing solids in an aqueous environment. More specifically, the present invention relates to a method of forming a salt layer surrounding lanthanum containing solids in an aqueous environment, thereby allowing further processing of the materials without dissolution.

BACKGROUND OF THE INVENTION

Lanthanum oxide containing solids, including but not limited to lanthanum gallates, lanthanum cobaltites, lanthanum manganites, lanthanum chromites, lanthanum ferrites, and combinations thereof, have been shown to be useful in a variety of industrial processes. For example, Lanthanum gallate has proven to be useful as a solid electrolyte material in the production of solid oxide fuel cells (SOFC). Unfortunately, these materials have poor stability in an aqueous environment. For example, in water, lanthanum gallate incongruently dissolves to $La^{3+}$ and $Ga_2O_3$ by the following reaction:

$$2LaGaO_3(s)+3H_2O \Leftrightarrow 2La^{3+}(a)+6OH^-(a)+Ga_2O_3(s). \quad [1]$$

This reaction in turn produces a large amount of hydroxyl ions which drives the pH of the solution up into a region where $Ga_2O_3$ becomes unstable (>pH 12). The increased number of hydroxyl ions also react with $La^{3+}$ to form $La(OH)_3$ beginning at pH 8. This combination of events renders the materials useless for further processing.

The solubility of these materials in water has led those skilled in the art to process the materials in non-aqueous environments. Unfortunately, non-aqueous processing typically requires the use of solvents that are biologically harmful and generally not environmentally friendly. However, in industrial and large scale manufacturing of these materials, the costs associated with environmentally safe disposal of these solvents, and the costs associated with safety procedures required for handling these solvents under current regulatory schemes, can often prove to be prohibitively expensive.

Thus, there exists a need for a method and techniques for processing lanthanum oxide containing solids in an aqueous environment.

SUMMARY OF THE INVENTION

The present invention allows lanthanum oxide containing solids to be processed in an aqueous environment by forming a partially soluble or insoluble salt coating around the lanthanum oxide containing solid in an aqueous environment. The present invention is a method whereby an aqueous solution containing a partially soluble or insoluble salt forming anion is provided. A soluble lanthanum oxide solid is then added to the solution, and the anion is then reacted with at least a portion of the lanthanum in the lanthanum oxide solid, thereby forming a partially soluble or insoluble salt coating around the lanthanum oxide solid.

Preferably, and not meant to be limiting, between ten and one hundred times more anions than lanthanum cations are provided to ensure sufficient anion presence for salt formation. In theory, the concentrations of anions required depends on the lanthanum oxide solubility. Since the solubility product of each variation of lanthanum oxide will be different, the specific amount of anion necessary to react with the free lanthanum will vary. To calculate the minimum amount of anion needed to react with a given amount of lanthanum in solution, the solubility product (Ksp) of the soluble lanthanum complex oxide is first determined. The theoretical minimum amount of anion then needed may be calculated by taking the square root of the Ksp, multiplying by the absolute value of the valence of lanthanum (3) and dividing by the absolute value of the valence of the reacting anionic species according to the following equation:

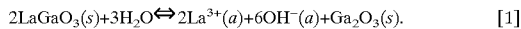

Minimum Anion Concentration to Passivate=(Ksp)^(½)×3/|anion valence.

While a great many anions are useful in the practice of the present invention, including but not limited to, $Cl^-$, $ClO^{3-}$, $Br^-$, $NO^{3-}$, $SO_4^{2-}$, $PO_4^{3-}$, $CO_3^{2-}$, $C_2O_4^{2-}$, $C_2H_3O_2^-$, and $C_6H_5O_7^{3-}$, it is preferred that the anion be selected from the group consisting of phosphate, carbonate, oxalate and combinations thereof.

The present invention is useful in the processing of any lanthanum oxide solids, including, but not limited to, lanthanum gallates, lanthanum cobaltites, lanthanum manganites, lanthanum chromites, lanthanum ferrites, and combinations thereof.

The present invention is particularly useful for ceramic powder processing, which is a very important aspect of solid oxide fuel cell development, and more particularly for processing lanthanum gallate in the manufacture of solid oxide fuel cell electrolyte material.

Objects

Accordingly, it is an object of the present invention to provide a method processing lanthanum oxide containing solids in an aqueous environment.

It is a further object of the present invention to provide an aqueous solution containing a partially soluble or insoluble salt forming anion, adding a soluble lanthanum oxide solid to the solution, reacting the anion with at least a portion of the lanthanum in the lanthanum oxide solid, thereby forming a partially soluble or insoluble salt coating around the lanthanum oxide solid.

DRAWINGS

FIG. 1 is a graph showing the analyte concentration as a function of pH for LSGM in DI $H_2O$ in an experiment conducted to demonstrate the present invention.

FIG. 2 is a graph showing the analyte as a function of pH for LSGM in 0.01 M $H_3PO_4$ in an experiment conducted to demonstrate the present invention.

FIG. 3 is a graph showing the analyte concentration as a function of pH for LSGM in 0.01 M $H_2C_2O_4$ in an experiment conducted to demonstrate the present invention.

DESCRIPTION OF THE PREFERRED EMBODIMENT(S)

To demonstrate a preferred embodiment of the present invention, an experiment was conducted whereby lanthanum gallate was processed in an aqueous environment.

Given amounts of $La_{0.9}Sr_{0.1}Ga_{0.8}Mg_{0.2}O_3$ (LSGM) (Praxair Specialty Ceramics, Woodinville, Wa.) were added to a measured quantity of $CO_2$-free, DI $H_2O$. The total number of samples was nine. The pH of the nine samples was varied in the range of 3 to 10.5 with each sample having a different pH value. Each sample was pH adjusted everyday with nitric acid ($HNO_3$) or tetraethyl ammonium hydroxide (TEAOH) until the pH value was stable for two consecutive days. After the pH became stable, a portion of each sample was centrifuged at 10,000×G to remove any solid. The supernatant was collected and sent for inductively coupled plasma spectroscopic analysis. The solution concentration of La, Sr, Ga, and Mg were measured. The above procedure was repeated for 0.01 M $H_3PO_4$, 0.0001 M $H_3PO_4$, 0.01 M $H_2C_2O_4$, and 0.001 M $H_2C_2O_4$ replacing the DI $H_2O$.

Continuing from equation 1, the following reactions detail the products for lanthanum gallate in phosphoric acid or oxalic acid solutions.

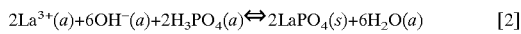

or

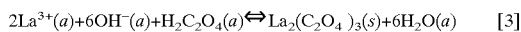

The other elements, Sr, Mg, and Ga, were ignored either because their solubility is relatively low or they are minor constituents.

LSGM solid in pH adjusted DI $H_2O$ was slow to equilibrate. The pH was adjusted five days/week for five weeks to reach a stable pH. The series containing LSGM in 0.01 M phosphoric acid stabilized the most rapidly. These solutions were stable after only ten pH adjustments. The equilibration time is an indication of the extent of dissolution or conversely, the formation of the salt coating. In general, the shorter the equilibration time, the lower the solid solubility and/or the better the formation of the salt layer. Equilibration time alone may not signify that a salt layer has formed; however along with equilibrium pH, ICP, and TEM data one may make a conclusion as to whether formation of the salt layer is occurring. The equilibrium pH of LSGM in DI $H_2O$ is 9.6. Table 1 shows that all of the equilibrium pH values of LSGM in the other solvents are lower than pH 9.6.

TABLE 1

The pH of the LSGM suspensions in the solvent without any other adjustment.

| Solvent | Natural Equilibrium pH |
|---|---|
| DI $H_2O$ | 9.6 |
| 0.01M $H_3PO_4$ | 3.6 |
| 0.0001 M $H_3PO_4$ | 9.1 |
| 0.01M $H_2C_2O_4$ | ~8 |
| 0.001M $H_2C_2O_4$ | 9.5 |

In particular, the equilibrium pH of LSGM in 0.01 M $H_3PO_4$ is 3.6. This considerably lower pH value indicates that little dissolution of LSGM has occurred. A small amount of phosphate has reacted with the lanthanum to form the salt layer and prevent further dissolution, and the pH of the suspension was reduced by the remaining acid because of the lack of competition by dissolution products, namely hydroxyl ions.

The ICP data as a function of pH from LSGM in DI $H_2O$, 0.01 M $H_3PO_4$, and 0.01 M $H_2C_2O_4$ are shown in FIG. 1–FIG. 3, respectively. Lanthanum, as expected has the highest solution concentration in deionized water and is highly pH dependent. In deionized water, the strontium and magnesium concentrations are relatively constant across the entire pH range 3–11. The addition of phosphate lowers the solution concentration of lanthanum considerably. The highest concentration of lanthanum in 0.01 M $H_3PO_4$ solution is 110 ppm, which is approximately 2% of the concentration of $La^{3+}$ measured in DI $H_2O$. The addition of oxalic acid resulted in approximately 30% less free lanthanum than is found in DI $H_2O$. The ICP data shows that both phosphate and oxalate are capable of minimizing free lanthanum in solution.

To determine if the salt layer would enable aqueous processing of LSGM, tape casting was performed. Defect free aqueous tapes of LSGM resulted from the use of both phosphoric acid and oxalic acid as the solvents. Electrical properties of the aqueous processed material were measured and determined to be unaffected by the addition of phosphate and oxalate.

These experiments demonstrated that oxalate or phosphate ions in an aqueous solution react with lanthanum ions to form a sparingly soluble to insoluble salt layer at the surface of the material, thereby passivating the lanthanum gallate. The salt, or passivation layer, thus allows aqueous processing of the lanthanum gallate material.

While the general nature and operation of the method of the present invention has been shown and described, the invention should in no way be limited to the specific example set forth in this description of the preferred embodiments; rather, it is presented merely to illustrate preferred and acceptable methods of practicing the present invention. Further, it will be apparent to those skilled in the art that many changes and modifications may be made without departing from the invention in its broader aspects. All such configurations are thus considered within the contemplation of the present invention, and the appended claims are therefore intended to cover all such changes and modifications which fall within the true spirit and scope of the invention.

We claim:

1. A method of manufacturing lanthanum oxide containing solids in an aqueous environment, comprising the steps of:
    a. providing an aqueous solution containing partially soluble or insoluble salt forming anions,
    b. adding a soluble lanthanum oxide solid selected from the group consisting of lanthanum gallates, lanthanum cobaltites, lanthanum manganites, lanthanum chromites, lanthanum ferrites, and combinations thereof, to said solution,
    c. reacting said anions with at least a portion of the lanthanum in said lanthanum oxide solid,
    d. thereby forming a partially soluble or insoluble salt coating around said lanthanum oxide solid.

2. The method of claim 1 wherein the anions are selected from the group consisting of phosphate, carbonate, oxalate and combinations thereof.

3. A method of manufacturing lanthanum gallate containing solids in an aqueous environment, comprising the steps of:
    a. providing an aqueous solution containing partially soluble or insoluble salt forming anions,
    b. adding lanthanum gallate to said solution,
    c. reacting said anions with at least a portion of the lanthanum in said lanthanum gallate,
    d. thereby forming a partially soluble or insoluble salt coating around said lanthanum gallate.

4. The method of claim 3 wherein the anions are selected from the group consisting of phosphate, carbonate, oxalate and combinations thereof.

5. A method of manufacturing lanthanum gallate containing solids in an aqueous environment, comprising the steps of:
   a. providing an aqueous solution containing phosphate anions,
   b. adding lanthanum gallate to said solution,
   c. reacting said phosphate anions with at least a portion of the lanthanum in said lanthanum gallate
   d. thereby forming a partially soluble or insoluble salt coating around said lanthanum gallate.

* * * * *

UNITED STATES PATENT AND TRADEMARK OFFICE
CERTIFICATE OF CORRECTION

PATENT NO. : 6,458,414 B1
DATED : October 1, 2002
INVENTOR(S) : Habeger et al.

It is certified that error appears in the above-identified patent and that said Letters Patent is hereby corrected as shown below:

Title page,
Item [54], please change "LATHENUM" to -- LATHANUM --.

Column 4,
Line 37, please replace "oxide" with -- gallate --.
Lines 42-46, please replace with the following, -- b. adding lanthanum gallate to said solution, --.
Lines 48 and 50, please replace "oxide solid" with -- gallate --.
Lines 54-66, please delete claims 3 & 4 in their entirety.

Column 5,
Line 1, please replace "5." with -- 3. --.

Signed and Sealed this

First Day of April, 2003

JAMES E. ROGAN
*Director of the United States Patent and Trademark Office*